US009820153B2

United States Patent
Clemenson et al.

(10) Patent No.: US 9,820,153 B2
(45) Date of Patent: Nov. 14, 2017

(54) CENTRALIZED ACCESS POINT PROVISIONING SYSTEM AND METHODS OF OPERATION THEREOF

(71) Applicant: WYFI, Inc., Pittsburg, CA (US)

(72) Inventors: Matthew Allen Clemenson, San Francisco, CA (US); Lawrence Anthony Dimatteo, III, Pittsburg, CA (US)

(73) Assignee: WYFI, Inc., Pittsburg, CA (US)

( * ) Notice: Subject to any disclaimer, the term of this patent is extended or adjusted under 35 U.S.C. 154(b) by 0 days.

(21) Appl. No.: 15/356,457

(22) Filed: Nov. 18, 2016

(65) Prior Publication Data

US 2017/0150362 A1 May 25, 2017

Related U.S. Application Data

(60) Provisional application No. 62/257,634, filed on Nov. 19, 2015.

(51) Int. Cl.
*H04W 12/08* (2009.01)
*H04W 48/10* (2009.01)
*H04L 29/12* (2006.01)
*H04L 12/24* (2006.01)
(Continued)

(52) U.S. Cl.
CPC ......... *H04W 12/08* (2013.01); *H04L 41/0806* (2013.01); *H04L 61/2038* (2013.01); *H04L 61/2069* (2013.01); *H04L 63/083* (2013.01); *H04L 63/0876* (2013.01);
(Continued)

(58) Field of Classification Search
CPC ..... H04W 12/08; H04W 12/06; H04W 48/10; H04L 63/107; H04L 41/0806; H04L 63/083; H04L 63/102; H04L 61/2038; H04L 63/0876; H04L 61/2069
See application file for complete search history.

(56) References Cited

U.S. PATENT DOCUMENTS

| 8,655,993 B1 | 2/2014 | Mixter |
| 8,862,096 B1 | 10/2014 | Viswanathan et al. |
| 2007/0127414 A1 | 6/2007 | Sridhar et al. |

(Continued)

FOREIGN PATENT DOCUMENTS

WO   WO 2017/187903   5/2017

*Primary Examiner* — Matthew Smithers
(74) *Attorney, Agent, or Firm* — Levine Bagade Han LLP

(57) ABSTRACT

A computer-implemented method of centrally provisioning access points is disclosed. The method comprises detecting, using a first access point (AP), a hardware address of a client device; securely transmitting the hardware address of the client device to one or more servers; matching the hardware address of the client device with a previously stored hardware address from a database; and retrieving a network identifier and a network password associated with the hardware address from the database, wherein the network identifier and the network password are associated with a second AP. The method further comprises generating, at the one or more servers, a customized provisioning profile with the network identifier and the network password; securely transmitting the customized provisioning profile to the first AP; downloading, at the first AP, the customized provisioning profile; and broadcasting a first wireless network at the first AP configured using the customized provisioning profile.

20 Claims, 7 Drawing Sheets

(51) Int. Cl.
*H04L 29/06* (2006.01)
*H04W 12/06* (2009.01)

(52) U.S. Cl.
CPC .......... *H04L 63/102* (2013.01); *H04L 63/107* (2013.01); *H04W 12/06* (2013.01); *H04W 48/10* (2013.01)

(56) References Cited

U.S. PATENT DOCUMENTS

| | | | |
|---|---|---|---|
| 2008/0130595 A1* | 6/2008 | Abdel-Kader | H04W 48/00 370/338 |
| 2008/0133734 A1 | 6/2008 | Jacobs et al. | |
| 2013/0024915 A1 | 1/2013 | Jones et al. | |
| 2013/0058274 A1* | 3/2013 | Scherzer | H04W 12/08 370/328 |
| 2013/0094402 A1 | 4/2013 | Muhamed et al. | |
| 2013/0170432 A1* | 7/2013 | O'Brien | H04W 4/06 370/328 |
| 2013/0247164 A1 | 9/2013 | Hoggan | |
| 2013/0333016 A1* | 12/2013 | Coughlin | H04W 12/06 726/9 |
| 2014/0235205 A1 | 8/2014 | Paluch et al. | |
| 2014/0289825 A1 | 9/2014 | Chan et al. | |
| 2014/0302842 A1* | 10/2014 | Lloyd | H04L 41/0806 455/426.1 |
| 2015/0026316 A1 | 1/2015 | Imes et al. | |
| 2015/0055505 A1 | 2/2015 | Lai et al. | |
| 2015/0264051 A1 | 9/2015 | Hoggan | |
| 2015/0289300 A1 | 10/2015 | Zhang et al. | |
| 2016/0050557 A1* | 2/2016 | Park | H04W 8/205 455/419 |

* cited by examiner

CENTRALIZED ACCESS POINT PROVISIONING SYSTEM AND METHODS OF OPERATION THEREOF

CROSS-REFERENCE TO RELATED APPLICATION

This application claims the benefit of U.S. Provisional Application No. 62/257,634 filed on Nov. 19, 2015, which is hereby incorporated by reference.

TECHNICAL FIELD

This disclosure relates generally to the field of wireless networks and, more specifically, to a centralized access point provisioning system and methods of operation thereof.

BACKGROUND

Portable client devices such as smartphones, tablets, laptops, smartwatches, fitness monitors, and household internet of things (IoT) devices are providing increasing levels of functionality to support modern life. However, taking full advantage of the functionality provided by such devices often require that these devices be connected to a high-speed connection. While cellular connections offer the advantage of a greater range of coverage, the cost of mobile broadband makes connecting such devices to a WiFi or wireless local area network (WLAN) the only real alternative for users seeking to stream multimedia content using such devices.

A client device might encounter hundreds of WiFi networks as a user of the client device goes about the user's day. Since WiFi networks are often secured by a wireless key or password, the user may temporarily lose his or WiFi connection when the user's client device encounters a new or unknown WiFi access point. Even when the user has the credentials to access such a network, the user may opt not to join the network in order to avoid having to manually enter a password or other identifying information.

Therefore, a solution is needed in order to dynamically provision access points encountered by a user's client device on the fly without intervention from the user. In addition, such a solution should provide added security benefits such as conditioning access to certain WiFi networks based on a location or identity of the user. Moreover, such a solution should also provide network administrators the flexibility to condition services or bandwidth allocations on the type of usage or the identity of the user.

SUMMARY

A centralized access point provisioning system is disclosed. In one embodiment, the system can comprise a first access point (AP) comprising a first AP processor, a first AP communication interface, and a first AP storage and one or more servers in communication with the first AP. The first AP can be located at a first geographic location.

The first AP processor of the first AP can be programmed to detect a hardware address of a client device broadcast by the client device. The first AP processor can detect the hardware address of the client device from a probe request broadcast from the client device. The first AP processor can also be programmed to securely transmit the hardware address of the client device to one or more servers.

The one or more servers can comprise one or more server processors, one or more server memory units, and one or more server communication interfaces. At least one of the server processors can be programmed to match the hardware address of the client device with a previously stored hardware address from a database accessible to the one or more servers. When a match is found, the at least one server processor can also be programmed to retrieve a network identifier and a network password associated with the hardware address from the database. The network identifier and the network password can be associated with a second AP at a second geographic location different from the first geographic location.

The at least one server processor can also be programmed to generate a customized provisioning profile. The customized provisioning profile can comprise the network identifier and the network password. The customized provisioning profile can comprise instructions to segment network traffic by virtual local area networks (VLANs) and assign the VLANs to unique router ports of a router in communication with the first AP or integrated with the first AP.

The at least one server processor can also be programmed to securely transmit the customized provisioning profile to the first AP using at least one of the server communication interfaces. The first AP processor of the first AP can be further programmed to download the customized provisioning profile received from the one or more servers.

The first AP can then broadcast a first wireless network configured using the customized provisioning profile. The client device can then automatically connect to the first wireless network without intervention from a user of the client device. The first AP processor can also be programmed to transmit a report of a successful connection by the client device to the one or more servers.

In some embodiments, the hardware address can be a media access control (MAC) address of the client device and the network identifier can be a service set identifier (SSID).

The system can further comprise a second AP (i.e., a previously provisioned AP) comprising a second AP processor, a second AP communication interface, and a second AP storage. The second AP processor can be programmed to establish a second wireless network at the second AP prior to the client device being in communication with the first AP. In these and other embodiments, at least one of the first AP and the second AP can be a WiFi access point, a WiFi router, or a WiFi hotspot. The client device can be connected to the second wireless network through the second AP using the network identifier and the network password.

The second AP processor can detect the hardware address of the client device and securely transmit the hardware address of the client device, the network identifier, and the network password to the database for inclusion in the database. At least one of the server processor can be further programmed to associate the hardware address of the client device with the network identifier and the network password.

The at least one server processor can further be programmed to retrieve a different network identifier and a different network password associated with the hardware address of the client device. The at least one server processor can also be programmed to generate a different customized provisioning profile and securely transmit the different customized provisioning profile to the first AP through the server communication interface. The different customized provisioning profile can comprise the different network identifier and the different network password. The first AP processor can further be programmed to establish and broadcast an additional wireless network at the first AP configured using the different customized provisioning profile. The at least one server processor can also instruct the first AP to periodically enable or disable the broadcast of at least one of the first wireless network and the additional wireless network at the first AP to prevent unauthorized intrusions or access to the first wireless network or the additional wireless network.

The first AP processor can further be programmed to disable the broadcast of the first wireless network when the hardware address of the client device is not detected by the first AP after a predetermined time period. The at least one server processor can also be programmed to select a particular network identifier and a network password associated with the particular network identifier based on at least one of a geographic coordinates of the client device received from a GPS unit of the client device, a user profile of a current user of the client device, and a usage time.

A computer-implemented method of centrally provisioning access points is disclosed. The method can comprise detecting, using a first access point (AP) processor of a first AP, a hardware address of a client device broadcast by the client device. The first AP can be at a first geographic location. The hardware address can be a media access control (MAC) address of the client device and the network identifier can be a service set identifier (SSID).

The method can further comprise securely transmitting the hardware address of the client device to one or more servers and matching, using one or more server processors of the one or more servers, the hardware address of the client device with previously stored hardware addresses from a database accessible to the one or more servers. The method can further comprise retrieving, using the one or more server processors, a network identifier and a network password associated with the hardware address from the database. The network identifier and the network password can be associated with a second AP (i.e., a previously provisioned AP) at a second geographic location different from the first geographic location.

The method can further comprise generating, using the one or more server processors, a customized provisioning profile. The customized provisioning profile can comprise the network identifier and the network password.

The method can further comprise securely transmitting the customized provisioning profile to the first AP using at least one server communication interface of the one or more servers. The method can further comprise downloading, using the first AP processor, the customized provisioning profile received from the one or more servers and establishing and broadcasting a first wireless network at the first AP configured using the customized provisioning profile. A client device can then automatically connect to the first wireless network without intervention from a user of the client device.

The method can further comprise receiving, using the at least one server processor, the network identifier, the network password, and the hardware address of the client device from the second AP prior to the client device being in communication with the first AP. The network identifier and the network password can be previously used by the client device to provision a second wireless network at the second AP. The method can further comprise storing the network identifier, the network password, and the hardware address in the database and associating the hardware address with the network identifier and the network password in the database.

The method can further comprise retrieving, using the one or more server processors, a different network identifier and a different network password associated with the hardware address of the client device. The method can further comprise generating, using the one or more server processors, a different customized provisioning profile. The different customized provisioning profile can comprise the different network identifier and the different network password.

The method can further comprise securely transmitting the different customized provisioning profile to the first AP through the server communication interface, establishing and broadcasting an additional wireless network at the first AP configured using the different customized provisioning profile, and periodically enabling or disabling the broadcast of at least one of the first wireless network and the additional wireless network at the first AP to prevent unauthorized intrusions.

The method can further comprise disabling the broadcast of the first wireless network when the hardware address of the client device is not detected by the first AP after a predetermined time period.

A non-transitory readable medium comprising computer executable instructions stored thereon is also disclosed. For example, the non-transitory readable medium can be a storage unit or memory of the one or more servers. The computer executable instructions can instruct one or more processors to receive a hardware address of a client device from a first access point (AP), match the hardware address of the client device with previously stored hardware addresses from a database, and retrieve a network identifier and a network password associated with the hardware address from the database.

The network identifier and the network password can be associated with a second AP at a second geographic location different from the location of the first AP.

The computer executable instructions can also instruct the one or more processors to generate a customized provisioning profile. The customized provisioning profile can comprise the network identifier and the network password.

The computer executable instructions can also instruct the one or more processors to securely transmit the customized provisioning profile to the first AP. The customized provisioning profile can comprise instructions to provision the first AP to establish and broadcast a first wireless network at the first AP. Once the first wireless network is established, the client device can automatically connect to the first wireless network without intervention from a user of the client device.

The computer executable instructions can also instruct the one or more processors to receive the network identifier, the network password, and the hardware address of the client device from the second AP prior to the client device being in communication with the first AP. The network identifier and the network password can be previously used by the client device to provision a second wireless network at the second AP.

The computer executable instructions can also instruct the one or more processors to store the network identifier, the network password, and the hardware address in the database and associate the hardware address with the network identifier and the network password in the database.

The computer executable instructions can also instruct the one or more processors to retrieve a different network identifier and a different network password associated with the hardware address of the client device and generate a different customized provisioning profile. The different customized provisioning profile can comprise the different network identifier and the different network password.

The computer executable instructions can also instruct the one or more processors to securely transmit the different customized provisioning profile to the first AP through the server communication interface. The different customized provisioning profile can comprise instructions to establish and broadcast an additional wireless network at the first AP and periodically transmit commands to enable or disable the broadcast of at least one of the first wireless network and the additional wireless network at the first AP to prevent unauthorized intrusions.

The computer executable instructions can further comprise instructions to transmit commands to the first AP to disable the broadcast of the first wireless network when the hardware address of the client device is not detected by the first AP after a predetermined time period.

DETAILED DESCRIPTION OF THE INVENTION

Figure 1:
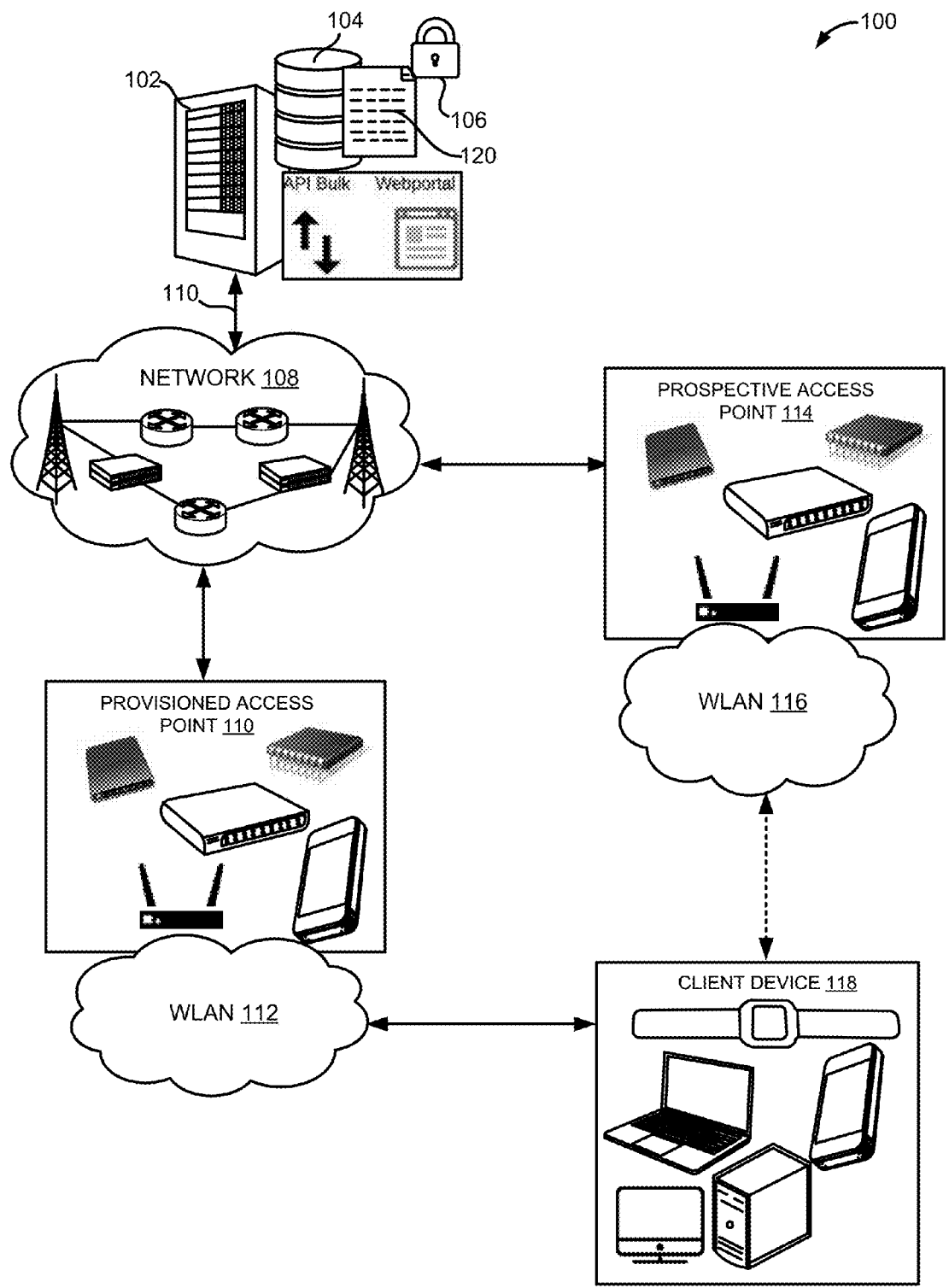
FIG. 1 illustrates an embodiment of a centralized access point provisioning system.

FIG. 1 illustrates a centralized access point provisioning system 100. The system 100 can include one or more servers 102 communicatively coupled to a plurality of access points (APs), including a provisioned AP 110 and a prospective AP 114 through a network 108. The network 108 can be any multi-hop network that covers regions, countries, continents, or a combination thereof. Examples of the network 108 can include a cellular network such as a 3G network, a 4G network, a long-term evolution (LTE) network; a sonic communication network; a satellite network; a wide area network such as the Internet, or a combination thereof. The one or more servers 102, the provisioned AP 110, the prospective AP 114, and one or more client devices 118 can be communicatively coupled to the network 108 through connections 110. The connections 110 can be wired connections, wireless connections, or a combination thereof.

In one embodiment, the provisioned AP 110 can be located at a first geographic location and the prospective AP 114 can be located at a second geographic location different from the first geographic location. In other embodiments, the provisioned AP 110 and the prospective AP 114 can be located at the same geographic location.

The one or more servers 102 can be a centralized server or a de-centralized server. For example, the one or more servers 102 can include a cloud server, a distributed server, a cluster server, a part of a server farm, or a combination thereof. The one or more servers 102 can also include a rack mounted server, a blade server, a mainframe, a dedicated desktop or laptop computer, or a combination thereof. The one or more servers 102 can also refer to or include a virtualized computing resource, a grid computing resource, a peer-to-peer distributed computing resource, or a combination thereof. At least one of the one or more servers 102 can have a server memory 202 (see FIG. 2). The server memory 202 can store a database 104.

In an alternative embodiment, the database 104 can be stored in a cloud storage system. In this embodiment, the one or more servers 102 can communicate with one or more devices in the cloud storage system. Also, in some embodiments, the database 104 can be distributed among multiple storage nodes.

The network 108 can include or be communicatively coupled to one or more wireless local area networks (WLANs), including WLAN112, WLAN 116, or a combination thereof. In one embodiment, WLAN 112 and WLAN 116 can be networks established under the IEEE's 802.11 protocol. More specifically, WLAN 112, WLAN 116, or a combination thereof can be a WiFi network. In other embodiments, WLAN 112, WLAN 116, or a combination thereof can be a personal area network or a WiFi hotspot.

The APs, including the provisioned AP 110, the prospective AP 114, or a combination thereof can be a wireless router, hotspot, gateway, modem, communication chip or integrated circuit (IC), or a combination thereof. For example, the APs, including the provisioned AP 110, the prospective AP 114, or a combination thereof can be a WiFi router, a WiFi hotspot, a WiFi chipset, or any combination thereof.

As shown in FIG. 1, each of the APs, such as the provisioned AP 110 or the prospective AP 114, can establish one or more WLANs. Each of the APs can establish the one or more WLANs using credentials, such as a network identifier 302 and a network password 304 (see FIG. 3). Also, as shown in FIG. 1, the client devices 118 can connect to the network 108 through the APs and the WLANs established by the APs.

In one embodiment, a prospective access point 114 can detect a hardware address 300 (see FIG. 3) of the client device 118 when the client device 118 is scanning or probing for a WLAN. The prospective access point 114 can detect the hardware address 300 of the client device 118 from a probe request broadcast from the client device 118. The hardware address 300 can refer to or comprise a media access control (MAC) address, a manufacturer's ID, a serial number, a part number of the client device 118 or a component of the client device 118, or a combination thereof.

The client device 118 can be a portable computing device such as a smartphone, a tablet, a laptop, a smartwatch, a health tracker, a personal entertainment device, or a combination thereof. In other embodiments, the client device 118 can be a desktop computer, a workstation, another server, or a combination thereof.

For example, a client device 118, such as a smartphone of a user, can constantly scan for available WLANs or WiFi networks when the WiFi functionality on the smartphone is enabled. The client device 118 can probe or scan public WLANs and attempt hidden WLANs when the client device is properly configured for such hidden WLANs. The client device 118 can scan or probe such WLANs by transmitting probe request frames or beacon frames to one or more prospective APs 114.

In this embodiment, a prospective AP 114 receiving such a probe or frame request can detect the hardware address 300, such as a MAC address, of the transmitting client device 118. The prospective AP 114 can store the hardware addresses 300 of such a client device 118 in an AP storage unit 212 (see FIG. 2). The AP storage unit 212 can be a local storage device or component of the prospective AP 114. The hardware addresses 300, such as MAC addresses, can be encrypted when stored in the AP storage unit 212. For example, the hardware addresses 300 can be stored in local storage using an Advanced Encryption Standard (AES) cipher. In one embodiment, the prospective AP 114 can temporarily store the hardware addresses 300 of the probing client devices 118 in the AP storage unit 212 for a limited period of time.

After detecting the hardware address 300 of the client device 118, the prospective AP 114 can transmit the hardware address 300 to the one or more servers 102. At least one server processor 200 of the one or more servers 102 can be programmed to query the database 104 for provisioning credentials 120 associated with the hardware address 300. The provisioning credentials 120 can include, but is not limited to, a network identifier 302 and a network password 304. The network identifier 302 can be a network name such as a network broadcast name, a service set identifier (SSID), a gateway name, or a combination thereof. In one embodiment, the network identifier 302 can be the network name or SSID associated with the WLAN 112 established by the provisioned AP 110. The network password 304 can be a password used to access a WLAN having the network identifier 302. For example, the network password 304 can be a wireless key used to access a particular WiFi network having an SSID of "UserHomeNet." The network password 304 can be a string of alphanumeric characters or symbols. In a more specific embodiment, the network password 304 can range from 8 to 63 characters.

In one embodiment, the database 104 can be a document-oriented database. For example, the database 104 can be a NoSQL database such as a MongoDB™ database. In other embodiments, the database 104 can be a column-oriented or key-value database. The database 104 can associate or pair hardware addresses 300 with one or more provisioning credentials 120. For example, a user can have a client device 118 with a MAC address of 88:58:95:45:84:48. The database 104 can associate this MAC address with one or more sets of provisioning credentials 120. As a more specific example, the database 104 can associate this particular MAC address with the provisioning credential 120 of "UserHomeNet" as the SSID or network identifier 302 and "Pa$$wOrd1" as the network password 304. The database 104 can also associate this same MAC address with a second provisioning credential 120 of "UserWorkNet" as the network identifier 302 and "Pa$$wOrd2" as the network password 304.

In one embodiment, the database 104 can be populated by hardware addresses 300 and provisioning credentials 120 received from provisioned APs 110. For example, the database 104 can receive provisioning credentials 120, including a network identifier 302 and a network password 304, from an access point which has been provisioned by the client device 118.

The database 104 can associate a hardware address 300 with a set of provisioning credentials 120 when a client device 118 having a particular hardware address 300 joins a WLAN established by a provisioned AP 110 with the set of provisioning credentials 120. For example, the database 104 can associate a client device 118 with the MAC address of 88:58:95:4 with the provisioning credential 120 of "User-HomeNet" and "Pa$$wOrd1" when the client device 118 having such a MAC address successfully joins a WLAN (such as WLAN 112) established by the provisioned AP 110.

In other embodiments, the database 104 can be populated with hardware addresses 300, provisioning credentials 120, or a combination thereof through a bulk transfer, a web portal established to receive such credentials, or credentials registered directly by the user. For example, the provisioning credentials 120 can be imported into the database 104 through a comma separated values (CSV) file, a TXT file, an XML file, or a combination thereof.

In an alternative embodiment not shown in FIG. 1, the database 104 can also associate provisioning credentials 120 with a particular hardware address 300 when the server 102 or the database 104 receives a wireless access profile or other configuration information from a securing client device as described in U.S. patent application Ser. No. 14/815,735 filed on Jul. 31, 2015, the contents of which are herein incorporated by reference in its entirety.

While FIG. 1 depicts an embodiment using one instance of each of the server 102, the database 104, WLAN 112, the provisioned AP 110, WLAN 116, the prospective AP 114, and the client device 118, it should be understood by one of ordinary skill in the art that the system 100 can include a plurality of servers 102, a plurality of provisioned APs 110, a plurality of prospective APs 114, and a plurality of client devices 118. In addition, each of the provisioned AP 110 and the prospective AP 114 can establish multiple WLANs.

Figure 2B:
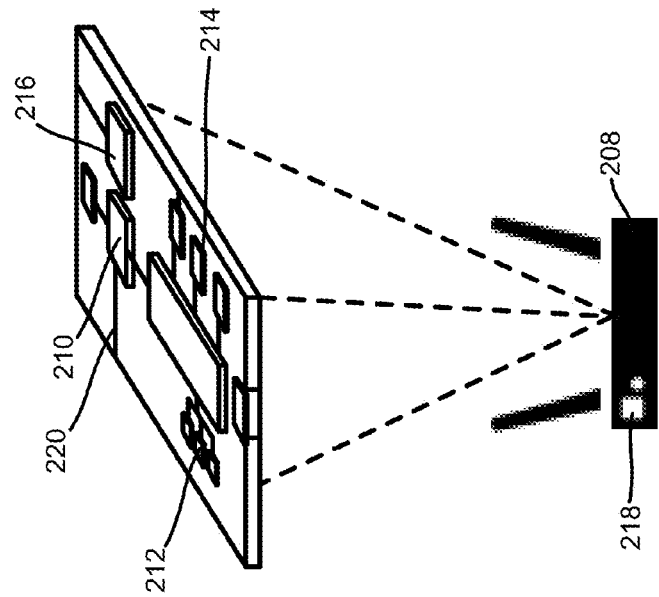
FIG. 2B illustrates an embodiment of an access point of the centralized access point provisioning system.
Figure 2A:
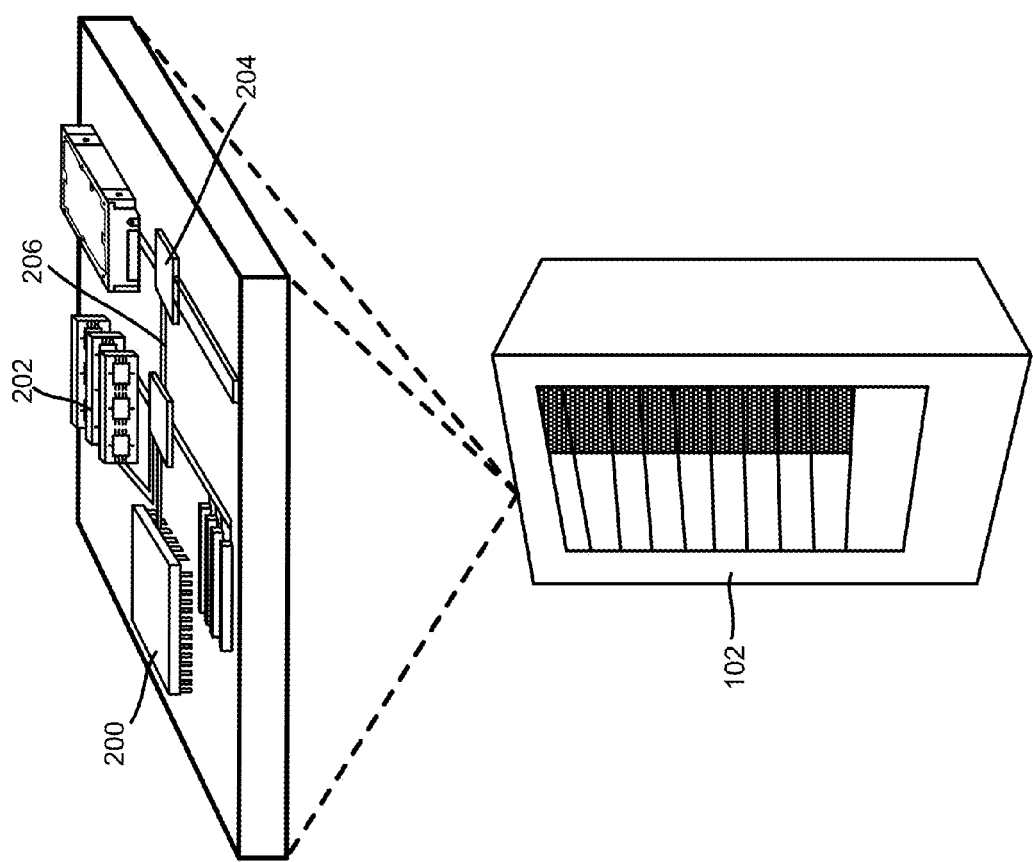
FIG. 2A illustrates an embodiment of one of the servers of the centralized access point provisioning system.

FIG. 2A illustrates an embodiment of one of the servers 102 of the system 100. The server 102 can have a server processor 200, a server memory 202, and a server communication interface 204. The server processor 200 can be coupled to the server memory 202 and the server communication interface 204 through high-speed buses 206.

The server processor 200 can include one or more central processing units (CPUs), graphical processing units (GPUs), Application-Specific Integrated Circuits (ASICs), field-programmable gate arrays (FPGAs), or a combination thereof. The server processor 200 can execute software stored in the server memory 202 to execute the methods or instructions described herein. The server processor 200 can be implemented in a number of different manners. For example, the server processor 200 can be an embedded processor, a processor core, a microprocessor, a logic circuit, a hardware finite state machine (FSM), a digital signal processor (DSP), or a combination thereof. As a more specific example the server processor 200 can be a 64-bit processor.

The server memory 202 can store software, data, tables, logs, databases, or a combination thereof. The server memory 202 can be an internal memory. Alternatively, the server memory 202 can be an external memory, such as a memory residing on a storage node, a cloud server, or a storage server. The server memory 202 can be a volatile memory or a non-volatile memory. For example, the server memory 202 can be a nonvolatile storage such as a non-volatile random access memory (NVRAM), Flash memory, disk storage, or a volatile storage such as static random access memory (SRAM). The server memory 202 can be the main storage unit for the server 102.

The server communication interface 204 can include one or more wired or wireless communication interfaces. For example, the server communication interface 204 can be a network interface card of the server 102. The server communication interface 204 can be a wireless modem or a wired modem. In one embodiment, the server communication interface 204 can be a WiFi modem. In other embodiments, the server communication interface 204 can be a 3G modem, a 4G modem, an LTE modem, a Bluetooth™ component, a radio receiver, an antenna, or a combination thereof. The server 102 can connect to or communicatively couple with a WLAN, such as WLAN 110 or WLAN 116, the network 108, or a combination thereof using the server communication interface 204. The server 102 can transmit or receive packets or messages using the server communication interface 204.

FIG. 2B illustrates an embodiment of an access point (AP) 208 of the system 100. The AP 208 can have an AP processor 210, AP storage 212, AP communication interface 214, and a locational unit having a global positioning system (GPS) receiver 216. In some embodiments, the AP 208 can also have a display 218. The AP processor 210 can be coupled to the AP storage 212, the AP communication interface 214, and the locational unit through high-speed buses 220.

The AP processor 210 can include one or more CPUs, GPUs, ASICs, FPGAs, or a combination thereof. The AP processor 210 can execute software or firmware stored in the AP storage 212 to execute the methods described herein. The AP processor 210 can be implemented in a number of different manners. For example, the AP processor 210 can include one or more embedded processors, processor cores, microprocessors, logic circuits, hardware FSMs, DSPs, or a combination thereof. As a more specific example the AP processor 210 can be a 32-bit processor such as an ARM™ processor.

The AP storage 212 can store software, firmware, data, logs, databases, or a combination thereof. In one embodiment, the AP storage 212 can be an internal memory. In another embodiment, the AP storage 212 can be an external storage unit. The AP storage 212 can be a volatile memory or a non-volatile memory. For example, the AP storage 212 can be a nonvolatile storage such as NVRAM, Flash memory, disk storage, or a volatile storage such as SRAM. The AP storage 212 can be the main storage unit for the AP 208.

The AP communication interface 214 can be a wired or wireless communication interface. For example, the AP communication interface 214 can be a network interface card of the AP 208. The AP communication interface 214 can also be a network interface chip or integrated circuit. In one embodiment, the AP communication interface 214 can be an LTE modem chip. In other embodiments, the AP communication interface 214 can be a radio receiver, an antenna, or a combination thereof. The AP 208 can connect to or communicatively couple with a WLAN, the network 108, or a combination thereof using the AP communication interface 214. The AP 208 can transmit or receive packets or messages using the AP communication interface 214.

The locational unit can have a GPS component such as the GPS receiver 216, an inertial unit, a magnetometer, a compass, or any combination thereof. The GPS receiver 216 can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 218 can be a touchscreen display such as a liquid crystal display (LCD), a thin film transistor (TFT) display, an organic light-emitting diode (OLED) display, or an active-matrix organic light-emitting diode (AMOLED) display. In certain embodiments, the display 218 can be a retina display, a haptic touchscreen, or a combination thereof. For example, when the AP 208 is a smartphone or other portable computing device, the display 218 can be the touchscreen display of the smartphone or other portable computing device. in some embodiments, the access point can be without a display 218.

The AP 208 can be the provisioned access point 110, the prospective access point 114, or a combination thereof. For purposes of the present disclosure, the AP processor 210 can refer to a processor of the provisioned access point 110, the prospective access point 114, or a combination thereof. Moreover, the AP storage 212 can refer to a memory of the provisioned access point 110, the prospective access point 114, or a combination thereof. In addition, the AP communication interface 214 can refer to a communication interface of the provisioned access point 110, the prospective access point 114, or a combination thereof. Furthermore, the GPS receiver 216 can refer to a GPS receiver of the provisioned access point 110, the prospective access point 114, or a combination thereof. Additionally, the display 218 can refer to the display of the provisioned access point 110, the prospective access point 114, or a combination thereof.

Also, for purposes of the present disclosure, the prospective access point 114 can be considered the first AP. In addition, the AP processor 210, the AP storage 212, and the AP communication interface 214 of the prospective access point 114 can be considered a first AP processor, a first AP storage, and a first AP communication interface, respectively. In addition, when the provisioned access point 110 is considered the second AP for purposes of the present disclosure, the AP processor 210, the AP storage 212, and the AP communication interface 214 of the provisioned access point 110 can be considered a second AP processor, a second storage, and a second AP communication interface, respectively.

Figure 3A:
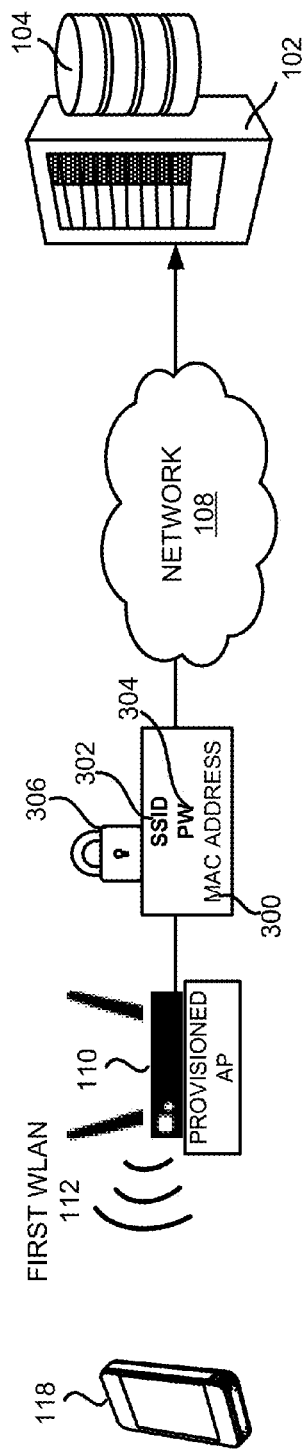
FIG. 3A illustrates an embodiment of a transmission from a provisioned access point to the server.

FIG. 3A illustrates an initial step in the method to centrally provision access points. This initial step, along with others, can result in the population of the database 104 with device hardware addresses 300 and provisioning credentials 120. FIG. 3A illustrates an example transmission from the provisioned AP 110 to the one or more servers 102 and the database 104 to initiate the process of centrally provisioning access points. As discussed above, the provisioned AP 110 can be an AP currently being used or previously used by the client device 118 to connect to the network 108 through a WLAN configured and broadcast by the provisioned AP 110. As shown in FIG. 1, the WLAN can be the WLAN 112 established by the provisioned AP 110. In one embodiment, the provisioned AP 110 can be provisioned manually using provisioning credentials 120 entered by a proprietor or administrator of the provisioned AP 110. In another embodiment, the provisioned AP 110 can be pre-provisioned by a manufacturer or distributor of the AP using provisioning credentials 120 set by the manufacturer or distributor.

The provisioned AP 110 can detect the hardware address 300, such as the MAC address, of the client device 118 connected to the WLAN 112. The client device 118 can connect to WLAN 112 using a set of provisioning credentials 120 including a network identifier 302 and a network password 304. The provisioned AP 110 can store the hardware address 300 of the client device 118 and the provisioning credentials 120 to the AP storage 212. The AP processor 210 of the provisioned AP 110 can then encrypt the hardware address 300 and the provisioning credentials 120 using a secure hash algorithm (SHA) function or another suitable encryption algorithm. For example, the AP processor can use a SHA-256 hash function, a SHA-512 hash function, or a SHA-2 hash function to encrypt the hardware address 300 and the provisioning credentials 120 for transmission. The steps performed by the provisioned AP 110 can be stored as firmware instructions or code stored in the AP storage 212 of the provisioned AP 110. For example, the firmware instructions can comprise computer-executable instructions written in the C-programming language, the JAVA™ programming language, assembly code, or a combination thereof.

For example, the provisioned AP 110 can be instructed to periodically report its latest provisioning credentials 120 and the hardware addresses 300 of client devices 118 connected to its WLANs to the one or more servers 102 or the database 104.

As shown in FIG. 3A, the provisioned AP 110 can securely transmit the hardware address 300 of the client device 118 along with the provisioning credentials 120, including the network identifier 302 and the network password 304, to the one or more servers 102. The provisioned AP 110 can transmit the hardware address 300 and the provisioning credentials 120 using an encryption protocol 306. For example, the encryption protocol 306 can be a secure sockets layer (SSL) protocol, a transport layer security (TLS) protocol, or a combination thereof. The provisioned AP 110 can transmit the encrypted hardware address 300, the encrypted network identifier 302, and the encrypted network password 304 individually or in combination.

In other embodiments not shown in FIG. 3A, the database 104 can be populated with hardware addresses 300, provisioning credentials 120, or a combination thereof through a bulk transfer or credentials registered or submitted directly by the user. For example, the hardware addresses 300 and provisioning credentials 120 can be imported into the database 104 through one or more comma separated value (CSV) files, TXT files, XML files, or a combination thereof transmitted to the database 104.

As shown in FIG. 3A, the one or more servers 102 can receive the encrypted hardware address 300, the encrypted network identifier 302, and the encrypted network password 304 through a server communication interface 204. At least one server processor 200 of the one or more servers 102 can be programmed to decrypt the encrypted hardware address 300, the encrypted network identifier 302, and the encrypted network password 304 and store the hardware address 300, the network identifier 302, and the network password 304 in the database 104. The server processor 200 can further encrypt the hardware address 300, the network identifier 302, and the network password 304 before storing such data in the database 104.

The server processor 200 can also be programmed to associate or link the hardware address 300 (such as the MAC address) of the client device 118 with the network identifier 302 and the network password 304. If the server 102 discovers the hardware address 300 is presently stored in the database 104, the server 102 can associate the newly received provisioning credentials 120 with the previously stored hardware address 300. In one embodiment, the hardware address 300 and the provisioning credentials 120 can be stored as part of one or more attribute-value pairs. In other embodiments, the hardware address 300 and the provisioning credentials 120 can be stored as part of one or more JavaScript Object Notation (JSON) objects. In addition, the hardware address 300 and the provisioning credentials 120 can be stored in the database 104 as nested key-value pairs.

Figure 3B:
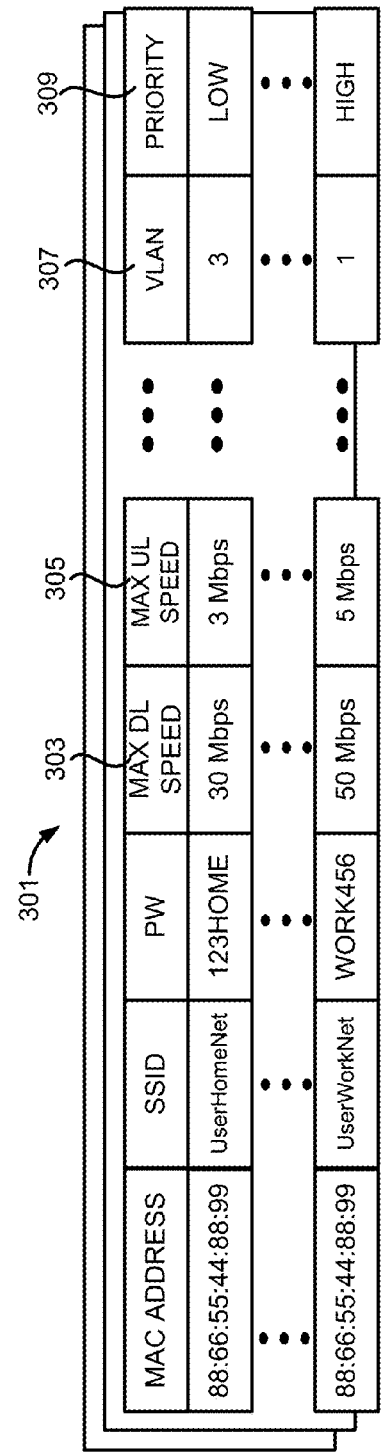
FIG. 3B illustrates an embodiment of usage conditions associated with hardware addresses or provisioning credentials in a database of the centralized access point provisioning system.

The server processor 200 can also be programmed to assign one or more usage conditions 301 to the hardware address 300, the provisioning credentials 120, or a combination thereof stored in the database 104 as shown in FIG. 3B. The usage conditions 301 can be implemented as flags or additional commands assigned to the fields of the database 104. The usage conditions 301 can include a connection speed such as an allocated download speed 303 or an allocated upload speed 305, a traffic segmentation criteria 307, a bandwidth allocation, a security level, a traffic prioritization 309, a quality of service (QoS), a connection time limit, or a combination thereof.

Figure 3C:
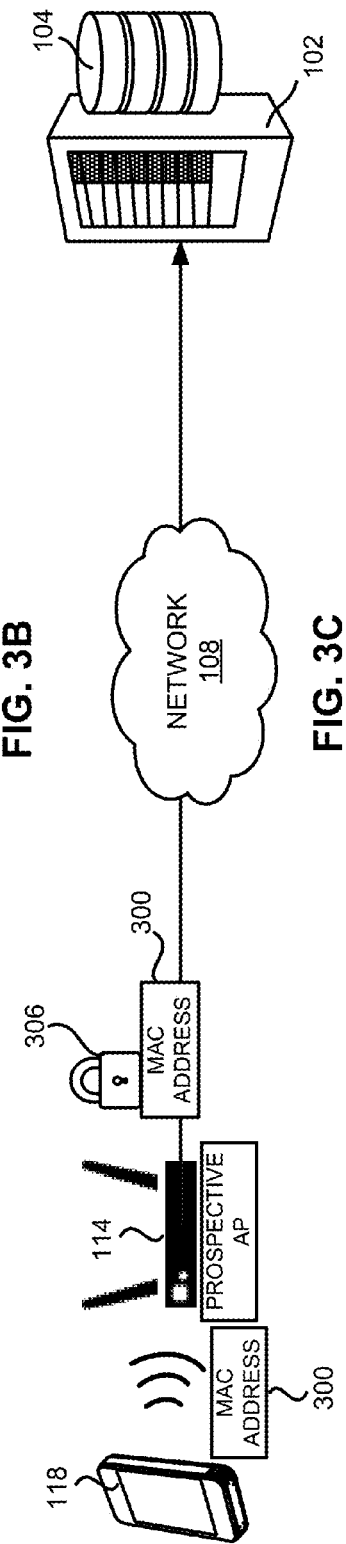
FIG. 3C illustrates an embodiment of a transmission from the prospective access point to the server.

FIG. 3C illustrates a method of detecting a hardware address 300 of a client device 118 at a prospective AP 114. As shown in FIG. 3C, the hardware address 300 of the client device 118 can be broadcast by the client device 118 when the client device 118 is within radio range or WiFi range of the prospective AP 114. The client device 118, such as a smartphone or laptop, can continuously probe or scan for public WLANs and attempt hidden WLANs when the client device is properly configured for such hidden WLANs. The client device 118 can scan or probe such WLANs by broadcasting and transmitting probe request frames or beacon frames to one or more prospective APs 114.

The AP processor 210 of the prospective AP 114 can detect the hardware address 300 of the broadcasting client device 118 from a probe request or a beacon frame received at the prospective AP 114. The AP processor 210 can then store the hardware address 300 along with other hardware addresses 300 from other client devices 118 in the AP storage 212. The AP processor 210 can periodically transmit the hardware addresses 300 stored in the AP storage 212, including the hardware address 300 of the client device 118, to the one or more servers 102. The prospective AP 114 can use an encryption protocol 306 to transmit the hardware addresses 300 to the one or more servers 102. The steps undertaken by the prospective AP 114 can be stored as instructions in the firmware of the prospective AP 114. For example, the firmware instructions can comprise computer-executable instructions written in the C-programming language, the JAVA™ programming language, assembly code, or a combination thereof.

In another embodiment, the prospective AP 114 can be instructed to make an application programming interface (API) call to the database 104 to report or transmit the hardware addresses 300 of the client devices 118 detected at the prospective AP 114. For example, the prospective AP 114 can make a Representational State Transfer (REST) API call or a Simple Object Access Protocol (SOAP) API call to the database 104.

At least one server processor 200 of the one or more servers 102 can be programmed to match the hardware address 300 of the client device 118 with a previously stored hardware address in the database 104. If a match is found, the at least one server processor 200 can be programmed to retrieve a network identifier 302 and a network password 304 associated with the hardware address 300. For example, the network identifier 302 and the network password 304 can be associated with another access point, such as the provisioned access point 110. The network identifier 302 and the network password 304 can be associated with an access point when the network identifier 302 and the network password 304 were used by an administrator or user of the access point to provision or configure the access point to broadcast a WLAN with the network identifier 302 and secured by the network password 304.

In some embodiments, the network identifier 302 and the network password 304 can be associated with an access point, such as the provisioned access point 110, at a different geographic location than the prospective access point 114. For example, the provisioned access point 110 can be located at the home of a user of the client device 118 and the prospective access point 114 can be located at a café or hotel. In other embodiments, the network identifier 302 and the network password 304 can be associated with a different access point at the same location as or in proximity to the prospective access point 114.

When multiple network identifier 302/network password 304 pairs are associated with the same hardware address 300, the at least one server processor 200 can select a particular network identifier 302/network password 304 pair based on the geographic location of the client device 118, a user profile associated with a user of the client device 118, a usage time, or a combination thereof.

The at least one server processor 200 of the one or more servers 102 can also be programmed to generate a customized provisioning profile 400 (see FIG. 4A) to provision the prospective AP 114. The customized provisioning profile 400 can be generated on the fly or on an ad hoc basis in response to a match of the hardware address 300 received from the prospective AP 114 and a previously stored hardware address 300 in the database 104.

In one embodiment, the customized provisioning profile 400 can be a modified access point configuration file. For example, the customized provisioning profile 400 can comprise machine-executable instructions or commands for running or rebooting an access point. In one embodiment, the customized provisioning profile 400 can be generated via a command line interface (CLI) provided by an original equipment manufacturer (OEM) of the access point. In another embodiment, the customized provisioning profile 400 can be generated through a web GUI provided by the OEM of the access point. In some embodiments, the customized provisioning profile 400 can be generated as a text file or an XML file. The customized provisioning profile 400 can be customized based on the operating system (OS) of the access point or the manufacturer of the access point.

The at least one server processor 200 can be programmed to generate the customized provisioning profile 400 using the network identifier 302 (e.g., network SSID) and the network password 304 retrieved from the database 104. In some embodiments, the customized provisioning profile 400 can instruct an access point to reboot and reconfigure the access point to broadcast a WLAN using the network identifier 302 and the network password 304 contained in the customized provisioning profile 400. In other embodiments, the customized provisioning profile 400 can instruct the access point to change the runtime configuration of the access point and broadcast a new WLAN using the network identifier 302 and the network password 304 without having to reboot.

The customized provisioning profile 400 can also include instructions to apply one or more usage conditions 301 to the wireless networks configured using a particular network identifier 302 or network password 304. For example, the at least one server processor 200 of the one or more servers 102 can generate the customized provisioning profile 400 based on the geographic location of the client device 118, a user profile associated with a user of the client device 118, a usage time, or a combination thereof. For example, the at least one server processor 200 can determine the location of the client device 118 as being in an event venue based on GPS coordinates obtained by a GPS unit of the client device 118, GPS coordinates received from the prospective AP 114, or a combination thereof. In this example, the at least one server processor 200 can provision an ad hoc WLAN at the prospective AP 114 with a bandwidth limit of 50 Mbps with the expectation that the user will share photos or stream video at such a location. Alternatively, the server 102 can determine the location of the client device 118 as being in a supermarket based on the GPS coordinates received from the client device 118, the prospective AP 114, or a combination thereof. In this example, the server 102 can provision an ad hoc WLAN at the prospective AP 114 with a bandwidth limit of 15 Mbps since the user will likely not be streaming multimedia content in the supermarket. The bandwidth limit, along with other usage conditions 301, can be included as additional instructions or commands in the customized provisioning profile 400.

Also, for example, the server 102 can provision an ad hoc WLAN with a higher bandwidth allocation for guests of a hotel with a higher membership level (such as a "Gold Member") than guests with a lower membership level (such as "Silver Member"). The server 102 can determine the membership levels of such users by cross-checking the MAC addresses of the users' client devices 118 with an additional database containing the MAC addresses of devices which have logged on to the hotel's various in-room WLANs.

The customized provisioning profile 400 can also be encrypted so that the network identifier 302, the network password 304, or a combination thereof is not made visible to a user of the client device 118.

Figure 4A:
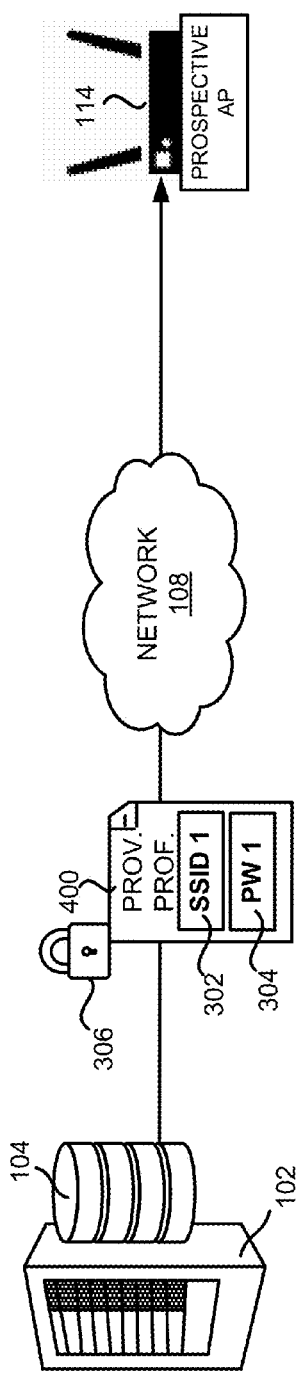
FIG. 4A illustrates an embodiment of a transmission from the server to the prospective access point.

As shown in FIG. 4A, the server processor 200 can be programmed to securely transmit the customized provisioning profile 400 to the prospective AP 114 using an encryption protocol 306. Upon receiving the customized provisioning profile 400, the AP processor 210 can be programmed to download the customized provisioning profile 400 and store the customized provisioning profile 400 in the AP storage 212, such as the non-volatile random-access memory (NVRAM), of the prospective AP 114.

The AP processor 210 can then be programmed to run the customized provisioning profile 400 and broadcast a WLAN, such as WLAN 116 shown in FIG. 1. At this point, the client device 118 can connect to the newly established WLAN 116 without intervention from a user of the client device 118.

The AP processor 210 of the prospective AP 114 can transmit a report of a successful connection by the client device 118 to the WLAN 116 configured using the customized provisioning profile 400 to the one or more servers 102, the database 104, or a combination thereof. For example, the firmware of the prospective AP 114 can instruct the AP processor 210 to transmit the connection status of the client device 118 to the prospective AP 114 as part of periodic API call to the one or more servers 102, the database, 104, or a combination thereof.

As a more specific example, a client device 118 with a MAC address of 88:66:55:44:88:99 can be associated with a set of provisioning credentials 120 (such as SSID: "UserHomeNet" and password: "123Home") in the database 104. A user carrying the client device 118 can decide to visit a grocery store while on vacation in a new destination. Upon entering the grocery store, the client device 118 can scan for available WLANs by transmitting probing beacons or frames. A prospective AP 114 in the grocery store can detect the MAC address of the client device 118 and make an API call to the server 102, the database 104, or a combination thereof to match the MAC address of the client device 118 with a previously stored MAC address. Upon locating the MAC address in the database 104, the server 102 can generate a customized provisioning profile 400 using provisioning credentials 120 previously associated with the hardware address 300 from the database 104. The sever 102 can encrypt the customized provisioning profile 400 and securely transmit the customized provisioning profile 400 to the prospective AP 114 in the grocery store. Upon receiving and downloading the customized provisioning profile 400, the prospective AP 114 can configure an ad hoc WLAN at the grocery store using the provisioning credentials 120 contained in the customized provisioning profile 400. The client device 118 can then automatically connect to the WLAN without any intervention from the user of the client device 118. The prospective AP 114 can then transmit a report of the successful connection of the client device 118 to the one or more servers 102.

In these and other embodiments, each of the APs in the system 100 can continuously query for last seen hardware addresses 300. Such hardware addresses 300 can include the MAC addresses of client devices 118 previously or presently connected to the AP. The AP processor 210 of each of the APs (for example, either the prospective AP 114 or the provisioned AP 110) can be programmed to disable the broadcast of a particular ad hoc WLAN when the hardware address 300 associated with the network identifier 302 of such a WLAN is not detected by the AP processor 210 after a predetermined time period. The predetermined time period can range from 30 minutes to one or more hours.

The AP can remove such an ad hoc WLAN to prevent unauthorized intrusions or to prevent spoofing of MAC addresses. In other embodiments, a server processor 200 of the one or more servers 102 can be programmed to disable the broadcast of a previously provisioned WLAN by generating a new customized provisioning profile 400 instructing the AP to remove the WLAN associated with a particular network identifier 302 and transmitting the new customized provisioning profile 400 to the AP.

Figure 4B:
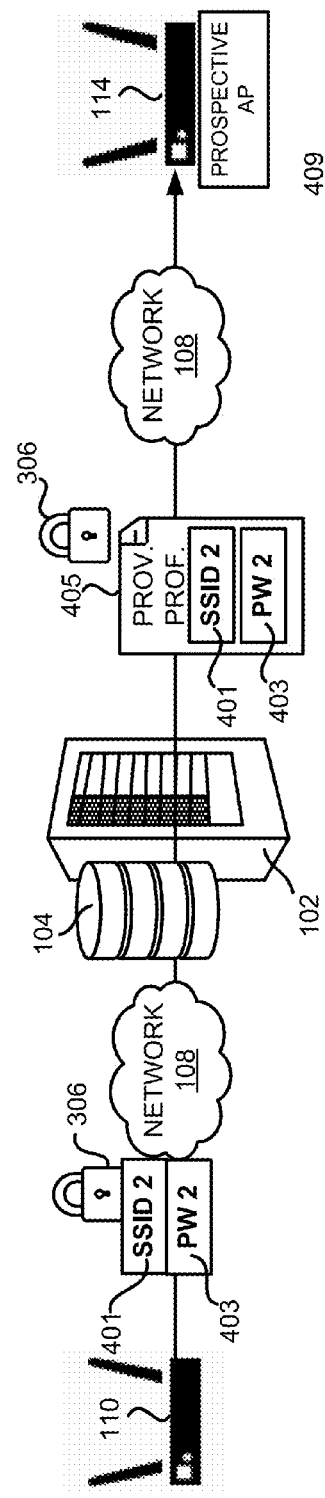
FIG. 4B illustrates an example of the prospective access point configured using a different network identifier and a different network password.

FIG. 4B illustrates that the server processor 200 can further be programmed to retrieve a different network identifier 401 and a different network password 403 from the database 104. The different network identifier 401 and the different password 403 can also be previously associated with the hardware address 300 of the client device 118. For example, the different network identifier 401 can be the SSID of a WLAN broadcast by a provisioned AP 110 at a café frequented by a user carrying the client device 118 or the SSID of a WLAN at a workplace of the user carrying the client device 118. The server processor 200 of the one or more servers 102 can be programmed to generate a different customized provisioning profile 405 with the different network identifier 401 and the different password 403. The server processor 200 can further be programmed to securely transmit the different customized provisioning profile 405 to the prospective AP 114 through the server communication interface 204. Upon receiving the different customized provisioning profile 405, the prospective AP 114 can broadcast a new WLAN or an additional WLAN using the different network identifier 401 and the different password 403. The client device 118 can automatically connect to this newly established WLAN without intervention from a user of the client device 118.

The one or more servers 102 can periodically generate different customized provisioning profiles 405 for the same client device 118 and push such different customized provisioning profiles 405 to an access point as a security measure to prevent unauthorized network intrusions. By doing so, the one or more servers 102 can periodically enable or disable the broadcast of different WLANs at one access point to prevent unauthorized access to any of the WLANs. In other embodiments, the AP processor 210 of the prospective AP can be programmed to rotate between different network identifiers and network passwords to prevent unauthorized intrusions.

Figure 4C:
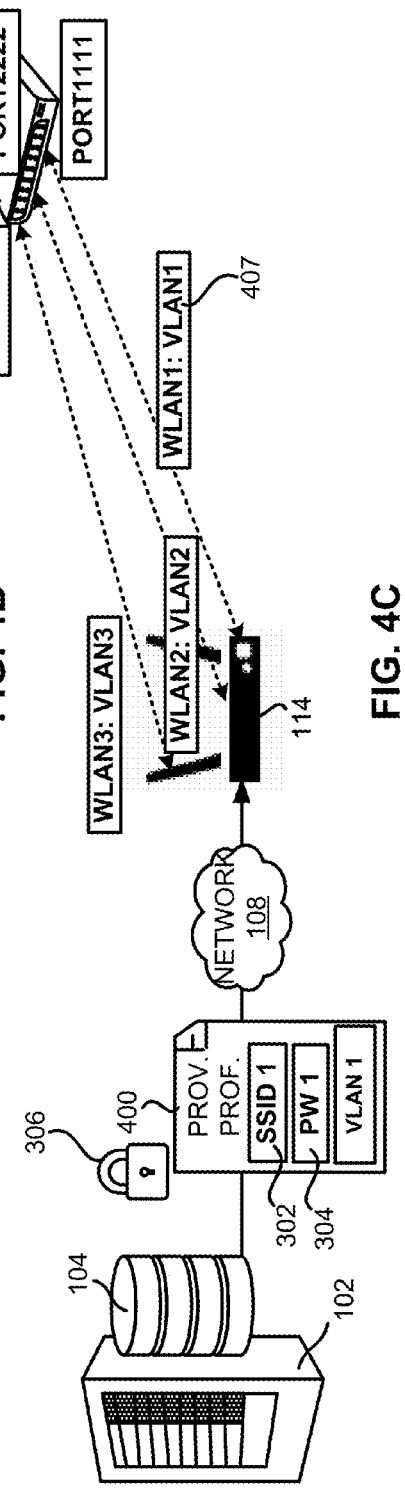
FIG. 4C illustrates an example of network traffic directed to various VLANs and each VLAN assigned to a unique router port of a router.

FIG. 4C illustrates that the customized provisioning profile 400 can comprise instructions or commands to segment network traffic at an access point by logically separated virtual local area networks (VLANs) 407 and assign the VLANs 407 to one or more unique router ports of a router 409 communicatively coupled with the access point. For example, an access point, such as the prospective AP 114, can download an instance of the customized provisioning profile 400 comprising instructions or commands to direct network traffic for a particular WLAN (for example, a WLAN having the SSID: "Guest_WiFi") to VLAN1. The same access point can also be configured to direct network traffic for another WLAN (for example, a WLAN having the SSID: "Employee_WiFi") to VLAN 2 and yet another WLAN (for example, a WLAN having the SSID: "Preferred_Guest_WiFi") to VLAN3.

The customized provisioning profile 400 can also comprise instructions to assign the VLAN1 to Port 1111 of the router 409. In this embodiment, each of the other two WLANs can also be assigned to different ports of the router 409. Assigning each VLAN to a unique router port can fully segregate and secure network traffic flowing through each VLAN.

The customized provisioning profile 400 can also comprise instructions or commands to apply various usage conditions 301 to the particular WLAN broadcast by the access point. For example, the WLAN having the SSID "Guest_WiFi" can be allocated a maximum download speed of 25 Mbps and a while the WLAN having the SSID "Preferred_Guest_WiFi" can be allocated a maximum download speed of 50 Mbps.

Figure 5:
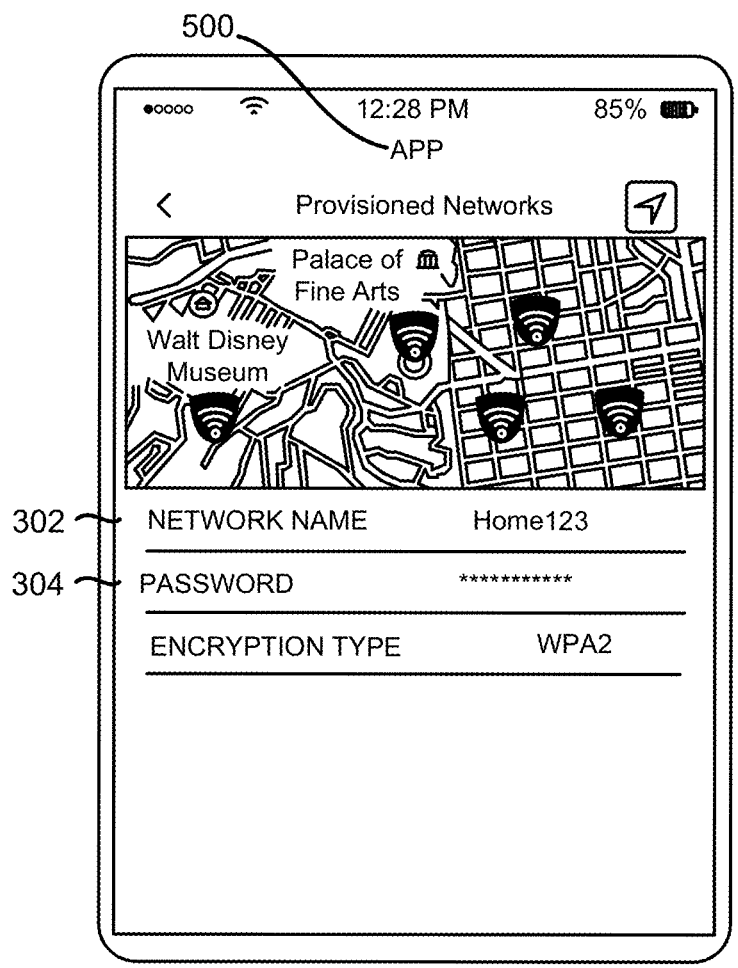
FIG. 5 illustrates an embodiment of a graphical user interface (GUI) of a client device connected to the centralized access point provisioning system.

FIG. 5 illustrates an embodiment of a graphical user interface (GUI) 500 displayed on a display of the client device 118, according to one or more embodiments. The GUI 500 can be rendered through an application 500. In one embodiment, the application 500 can be an iOS application written using the Xcode™ programming language, the Swift™ programming language, or a combination thereof. In other embodiments, the application 500 can be written using the Java™ programming language, Objective-C programming language, or a C programming language.

As seen in FIG. 5, a user of the client device 118 can view the locations of various APs, including provisioned APs 110 and prospective APs 114, through a map GUI rendered by the application 500.

Figure 6:
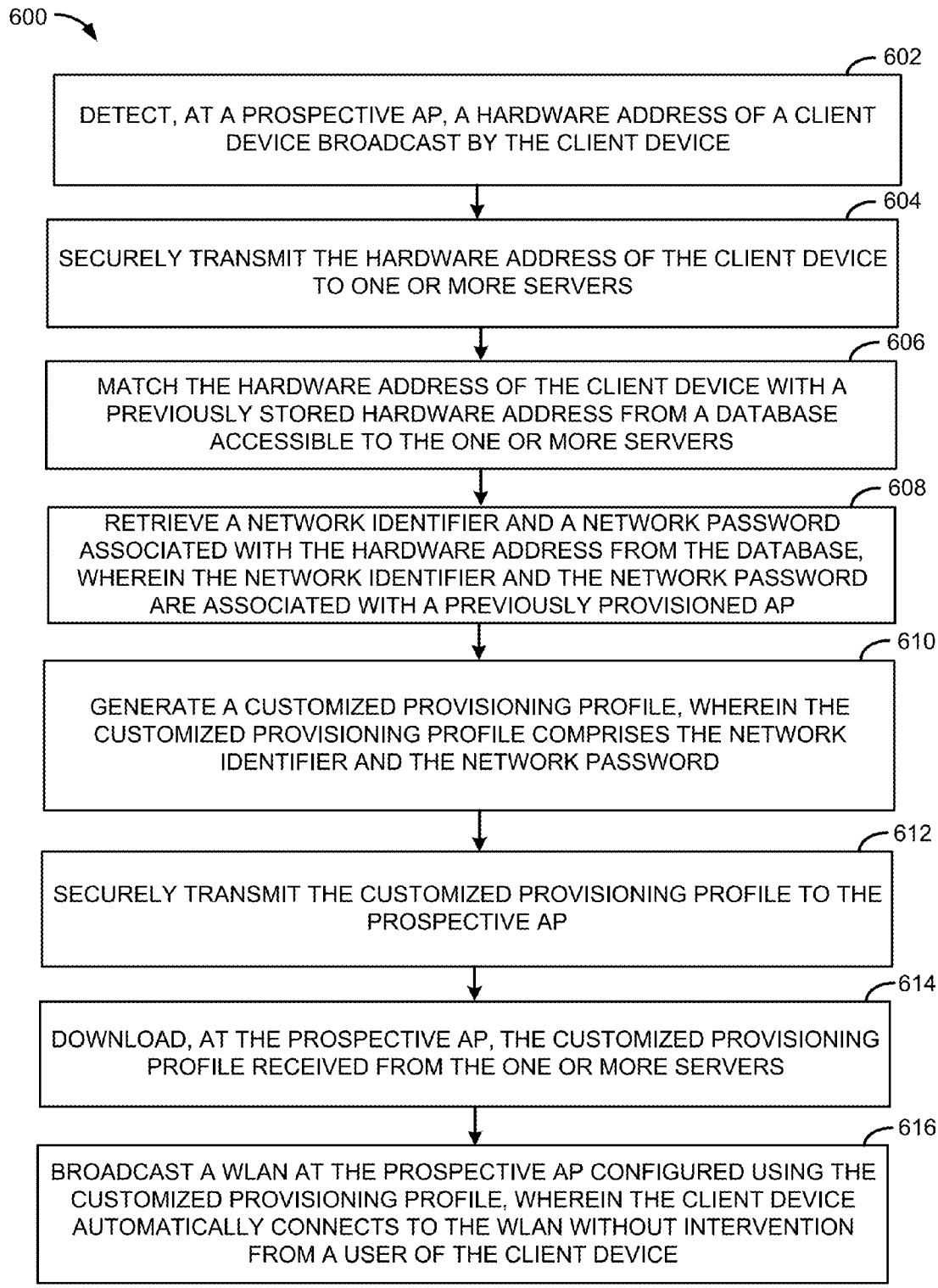
FIG. 6 illustrates a method of operation of the centralized access point provisioning system.

FIG. 6 illustrates a method 600 of operation of the centralized access point provisioning system 100. The method 600 can include detecting, using a processor of a prospective AP 114, a hardware address 300 of a client device 118 broadcast by the client device 118 in WiFi range of a prospective AP 114 in operation 602. The method 600 can also include securely transmitting the hardware address 300 of the client device 118 to one or more servers 102 in operation 604. The method 600 can also include matching, using the processors of the one or more servers 102, the hardware address 300 of the client device 118 with a previously stored hardware address from a database 104 accessible to the one or more servers 102 in operation 606. The method 600 can also include retrieving, using the one or more server processors, a network identifier 302 and a network password 304 associated with the hardware address 300 from the database 104, wherein the network identifier 302 and the network password 304 are associated with a previously provisioned AP 110 at a separate location from the prospective AP 114 in operation 608.

The method 600 can also include generating, using the one or more server processors, a customized provisioning profile 400 in operation 610. The customized provisioning profile 400 can comprise the network identifier 302 and the network password 304. The method 600 can also include securely transmitting the customized provisioning profile 400 to the prospective AP 114 in operation 612. The method 600 can also include downloading, at the prospective AP 114, the customized provisioning profile 400 received from the one or more servers 102 in operation 614. The method 600 can also include broadcasting a WLAN at the prospective AP 114 configured using the customized provisioning profile 400 in operation 616. At this point, the client device 118 can connect to the WLAN automatically without intervention from a user of the client device 118.

Figure 7:
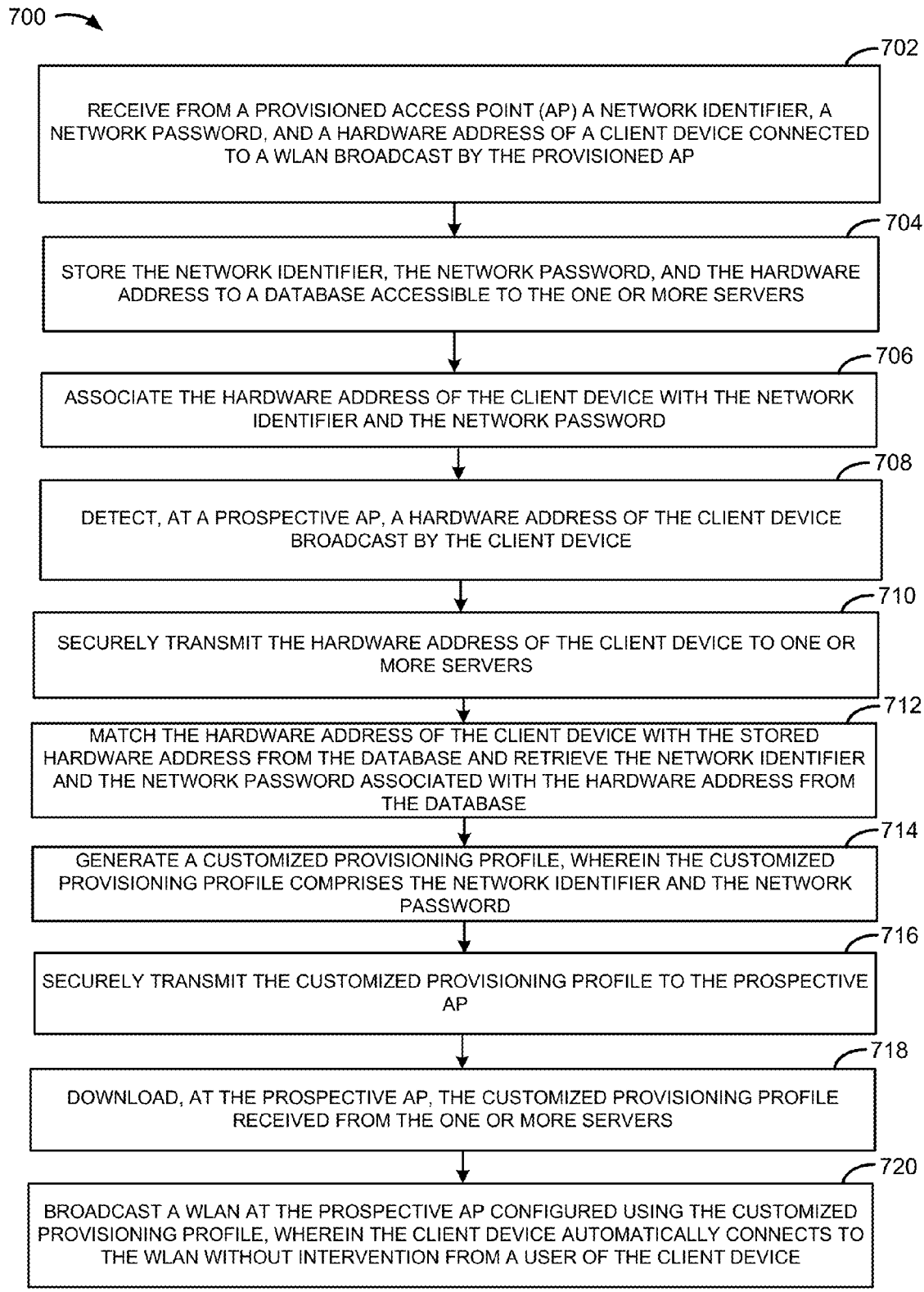
FIG. 7 illustrates another method of operation of the centralized access point provisioning system.

FIG. 7 illustrates yet another method 700 of operation of the centralized access point provisioning system 100. The method 700 can include receiving, from a provisioned AP 110, a network identifier 302, a network password 304, and a hardware address 300 of a client device 118 connected to a WLAN broadcast by the provisioned AP 110 in operation 702. The network identifier 302 and the network password 304 can be used by the client device 118 to connect to the WLAN broadcast by the provisioned AP 110.

The method 700 can further include storing the network identifier 302, the network password 304, and the hardware address 300 to a database 104 in operation 704. The method 700 can also include associating, in the database 104, the hardware address 300 of the client device 118 with the network identifier 302 and the network password 304 in operation 706.

The method 700 can further include detecting, using a processor of a prospective AP 114, the hardware address 300 of the client device 118 broadcast by the client device 118 in WiFi range of a prospective AP 114 in operation 708. The method 700 can further include securely transmitting the hardware address 300 of the client device 118 to one or more servers 102 in operation 710. The method 700 can also include matching, using the processors of the one or more servers 102, the hardware address 300 of the client device 118 with the previously stored hardware address from the database 104 and retrieving, from the database 104, the network identifier 302 and the network password 304 associated with the hardware address 300 from the database 104 in operation 712.

The method 700 can further include generating, using the one or more server processors, a customized provisioning profile 400 in operation 714. The customized provisioning profile 400 can comprise the network identifier 302 and the network password 304. The method 700 can also include securely transmitting the customized provisioning profile 400 to the prospective AP 114 in operation 716. The method 700 can also include downloading, at the prospective AP 114, the customized provisioning profile 400 received from the one or more servers 102 in operation 718. The method 700 can also include broadcasting a WLAN at the prospective AP 114 configured using the customized provisioning profile 400 in operation 720. At this point, the client device 118 can connect to the WLAN automatically without intervention from a user of the client device 118.

It should be understood by one of ordinary skill in the art that the methods disclosed herein can also be implemented as firmware configured to be integrated into the code stack of a mobile platform or a web platform. For example, the methods disclosed herein can be implemented as executable code configured to be integrated into the code stack of an online home sharing platform.

The system 100 and methods described in the present disclosure provides an improvement in the field of WiFi network management. The system 100 and methods described herein provides improvements in how network access is granted to guest devices or guest users. For example, a user of a client device can be granted access to a new WLAN, such as a WLAN at a café or a hotel, without having to know the network name or password associated with the new WLAN. In addition, an enterprise can use the methods and system 100 described herein to purposely block devices from accessing certain parts of an enterprise network. For example, a network administrator of the enterprise network can add certain MAC addresses to an address blacklist stored in a centralized database or create artificial "dummy" networks for unwelcomed users or devices. Moreover, the system 100 and methods described in the present disclosure can be used to digitally track the movement of hardware devices to prevent device theft.

Moreover, the system 100 and methods described herein provides improvements in the interaction of mobile client devices with wireless access points. The system 100 and methods described herein provides improvements in how mobile client devices connect to wireless access points. For example, by provisioning access points on-the-fly using identifiers or passwords stored in a centralized database, a mobile client device such as a mobile phone, tablet, or smartwatch, can automatically and seamlessly transition from one AP to another without requiring the user of such a mobile client device to manually enter credentials through a network settings menu of the device. In addition, the system 100 and methods described herein can utilize currently existing access points or access point networks, thereby making the system 100 and methods described herein a cost-effective solution.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A centralized access point provisioning system, comprising:
   a first access point (AP) comprising a first AP processor, a first AP communication interface, and a first AP storage, wherein the first AP processor is programmed to:
   detect a hardware address of a client device broadcast by the client device, securely transmit the hardware address of the client device to one or more servers, wherein the one or more servers further comprises one or more server processors, one or more server memory units, and one or more server communication interfaces, and wherein at least one of the server processors is programmed to:

match the hardware address of the client device with a previously stored hardware address from a database accessible to the one or more servers, retrieve the network identifier and the network password associated with the hardware address from the database, wherein the network identifier and the network password are associated with a second AP, and wherein the network identifier and the network password are selected based on at least one of a geographic coordinates of the client device received from a GPS unit of the client device, a user profile of a current user of the client device, and a usage time, generate a customized provisioning profile, wherein the customized provisioning profile comprises the network identifier and the network password, securely transmit the customized provisioning profile to the first AP using at least one of the server communication interfaces; and wherein the first AP processor is further programmed to:
download the customized provisioning profile received from the one or more servers, and
broadcast a first wireless network at the first AP configured using the customized provisioning profile, wherein the first wireless network allows the client device to connect to the first wireless network without intervention from a user of the client device.

2. The system of claim 1, wherein the hardware address is a media access control (MAC) address of the client device and the network identifier is a service set identifier (SSID).

3. The system of claim 1, wherein the first AP processor is further programmed to transmit a report of a successful connection by the client device to the one or more servers.

4. The system of claim 1, wherein t least one of the server processors is programmed to:
receive the network identifier, the network password, and the hardware address of the client device from the second AP prior to the client device being in communication with the first AP,
wherein the network identifier and the network password were previously used to provision a second wireless network at the second AP;
store the network identifier, the network password, and the hardware address in the database, and
associate the hardware address with the network identifier and the network password in the database.

5. The system of him 1, wherein at least one of the server processors is further programmed to:
retrieve a different network identifier and a different network password associated with the hardware address of the client device;
generate a different customized provisioning profile, wherein the different customized provisioning profile comprises the different network identifier and the different network password;
securely transmit the different customized provisioning to the first AP through the server communication interface;
broadcast an additional wireless network at the first AP configured using the different customized provisioning profile; and periodically enable or disable the broadcast of at least one of the first wireless network and the additional wireless network at the first AP to prevent unauthorized intrusions.

6. The system of claim 1, wherein the first AP processor is further programmed to disable the broadcast of the first wireless network when the hardware address of the client device is not detected by the first AP after a predetermined time period.

7. The system of claim 1, wherein the first AP detects the hardware address of the client device from a probe request broadcast from the client device.

8. The system of claim 1, wherein at least one of the first AP and the second AP is a WiFi router or a WiFi hotspot.

9. A computer-implemented method of centrally provisioning access points, comprising:
detecting, using a first access point (AP) processor of a first AP, a hardware address of a client device broadcast by the client device:
securely transmitting the hardware address of the client device to one or more servers:
matching, using one or more server processors of the one or more servers, the hardware address of the client device with a previously stored hardware address from a database accessible to the one or more servers;
retrieving, using the one or more server processors, a network identifier and a network password associated with the hardware address from the database, wherein the network identifier and the network password are associated with a second AP, and wherein the network identifier and the network password are selected based on at least one of a geographic coordinates of the client device received from a GPS unit of the client device, a user profile of a current user of the client device, and a usage time;
generating, using the one or more server processors, a customized provisioning profile, wherein the customized provisioning profile comprises the network identifier and the network password;
securely transmitting the customized provisioning profile to the first AP using at least one server communication interface of the one or more servers;
downloading, using the first AP processor, the customized provisioning profile received from the one or more servers; and
broadcasting a first wireless network at the first AP configured using the customized provisioning profile, Wherein the first wireless network allows the client device to connect to the first wireless network without intervention from a user of the client device.

10. The computer-implemented method of claim 9, wherein the hardware address is a media access control (MAC) address of the client device and the network identifier is a service set identifier (SSID).

11. The computer-implemented method of claim 9, further comprising:
receiving, using the at least one server processor, the network identifier, the network password, and the hardware address of the client device from the second AP prior to the client device being in communication with the first AP,
wherein the network identifier and the network password were previously used to provision a second wireless network at the second AP;
storing the network identifier, the network password, and the hardware address in the database, and associating the hardware address with the network identifier and the network password in the database.

12. The computer-implemented method of claim 9, further comprising:
retrieving, using the one or more server processors, a different network identifier and a different network password associated with the hardware address of the client device;
generating, using the one or more server processors, a different customized provisioning profile, wherein the different customized provisioning profile comprises the different network identifier and the different network password;
securely transmitting the different customized provisioning profile to the first AP through the server communication interface;
broadcasting, at the first AP, an additional wireless network configured using the different customized provisioning profile; and
periodically enabling or disabling the broadcast of at least one of the first wireless network and the additional wireless network at the first AP to prevent unauthorized intrusions.

13. The computer-implemented method of claim 9, further comprising disabling, at the first AP, the broadcast of the first wireless network when the hardware address of the client device is not detected by the first AP after a predetermined time period.

14. A non-transitory readable medium comprising computer executable instructions stored thereon, wherein the computer executable instructions instruct one or more processors to:
receive a hardware address of a client device from a first access point (AP);
match the hardware address of the client device with a previously stored hardware address from a database;
retrieve a network identifier and a network password associated with the hardware address from the database, wherein the network identifier and the network password are associated with a second AP, and wherein the network identifier and the network password are selected based on at least one of a geographic coordinates of the client device received from a GPS unit of the client device, a user profile of a current user of the client device, and a usage time:
generate a customized provisioning profile, wherein the customized provisioning profile comprises the network identifier and the network password; and
securely transmit the customized provisioning profile to the first AP,
wherein the customized provisioning profile comprises instructions to provision the first AP to broadcast a first wireless network at the first AP, and
wherein the first wireless network allows the client device to connect to the first wireless network without intervention from a user of the client device.

15. The non-transitory readable medium of claim 14, wherein the hardware address is a media access control (MAC) address of the client device and the network identifier is a service set identifier (SSID).

16. The non-transitory readable medium of claim 14, further comprising computer executable instructions instructing the one or more processors to:
receive the network identifier, the network password, and the hardware address of the client device from the second AP prior to the client device being in communication with the first AP,
wherein the network identifier and the network password were previously used to provision a second wireless network at the second AP;
store the network identifier, the network password, and the hardware address in the database, and
associate the hardware address with the network identifier and the network password in the database.

17. The non-transitory readable medium of claim 14, further comprising computer executable instructions instructing the one or more processors to:
retrieve a different network identifier and a different network password associated with the hardware address of the client device;
generate a different customized provisioning profile, wherein the different customized provisioning profile comprises the different network identifier and the different network password;
securely transmit the different customized provisioning profile to the first AP through the server communication interface, wherein the different customized provisioning profile comprises instructions to broadcast an additional wireless network at the first AP; and
periodically transmit commands to enable or disable the broadcast of at least one of the first wireless network and the additional wireless network at the first AP to prevent unauthorized intrusions.

18. The non-transitory readable medium of claim 14, further comprising computer executable instructions instructing the one or more processors to transmit commands to the first AP to disable the broadcast of the first wireless network when the hardware address of the client device is not detected by the first AP after a predetermined time period.

19. A centralized access point provisioning system, comprising:
a first access point (AP) comprising a first AP processor, a first AP communication interface, and a first AP storage, wherein the first AP processor is programmed to:
detect a hardware address of a client device broadcast by the client device,
securely transmit the hardware address of the client device to one or more servers,
wherein the one or more servers further comprises one or more server processors, one or more server memory units, and one or more server communication interfaces, and wherein at least one of the server processors is programmed to:
match the hardware address of the client device with a previously stored hardware address from a database accessible to the one or more servers,
retrieve the network identifier and the network password associated with the hardware address from the database, wherein the network identifier and the network password are associated with a second AP,
generate a customized provisioning profile, wherein the customized provisioning profile comprises the network identifier and the network password, wherein the customized provisioning profile comprises instructions to segment network traffic by virtual local area networks (VLANs) and assign the VLANs to unique router ports of a router in communication with the first AP or integrated with the first AP,
securely transmit the customized provisioning profile to the first AP using at least one of the server communication interfaces; and wherein the first AP processor is further programmed to:
  download the customized provisioning profile received from the one or more servers, and
  broadcast a first wireless network at the first AP configured using the customized provisioning profile, wherein the first wireless network allows the client device to connect to the first wireless network without intervention from a user of the client device.

20. A computer-implemented method of centrally provisioning access points, comprising:
  detecting, using a first access point (AP) processor of a first AP, a hardware address of a client device broadcast by the client device:
  securely transmitting the hardware address of the client device to one or more servers;
  matching, using one or more server processors of the one or more servers, the hardware address of the client device with a previously stored hardware address from a database accessible to the one or more servers;
  retrieving, using the one or more server processors, a network identifier and a network password associated with the hardware address from the database, wherein the network identifier and the network password are associated with a second AP;
  generating, using the one or more server processors, a customized provisioning profile, wherein the customized provisioning profile comprises the network identifier and the network password, wherein the customized provisioning profile comprises instructions to segment network traffic by virtual local area networks (VLANs) and assign the VLANs to unique router ports of a router in communication with the first AP or integrated with the first AP;
  securely transmitting the customized provisioning profile to the first AP using at least one server communication interface of the one or more servers;
  downloading, using the first AP processor, the customized provisioning profile received from the one or more servers; and
  broadcasting a first wireless network at the first AP configured using the customized provisioning profile, wherein the first wireless network allows the client device to connect to the first wireless network without intervention from a user of the client device.

* * * * *

UNITED STATES PATENT AND TRADEMARK OFFICE
CERTIFICATE OF CORRECTION

PATENT NO. : 9,820,153 B2  
APPLICATION NO. : 15/356457  
DATED : November 14, 2017  
INVENTOR(S) : Matthew Allen Clemenson et al.

It is certified that error appears in the above-identified patent and that said Letters Patent is hereby corrected as shown below:

In the Claims

In Claim 1, Lines 11 and 12, please replace "retrieve the network identifier and the network password associated with the hardware address" with --retrieve a network identifier and a network password associated with the hardware address--.

In Claim 5, Line 53, please replace "The system of him 1" with --The system of claim 1--.

In Claim 19, Lines 53 and 54, please replace "retrieve the network identifier and the network password associated with the hardware address" with --retrieve a network identifier and a network password associated with the hardware address--.

Signed and Sealed this  
Third Day of July, 2018

Andrei Iancu  
*Director of the United States Patent and Trademark Office*